UNITED STATES PATENT OFFICE.

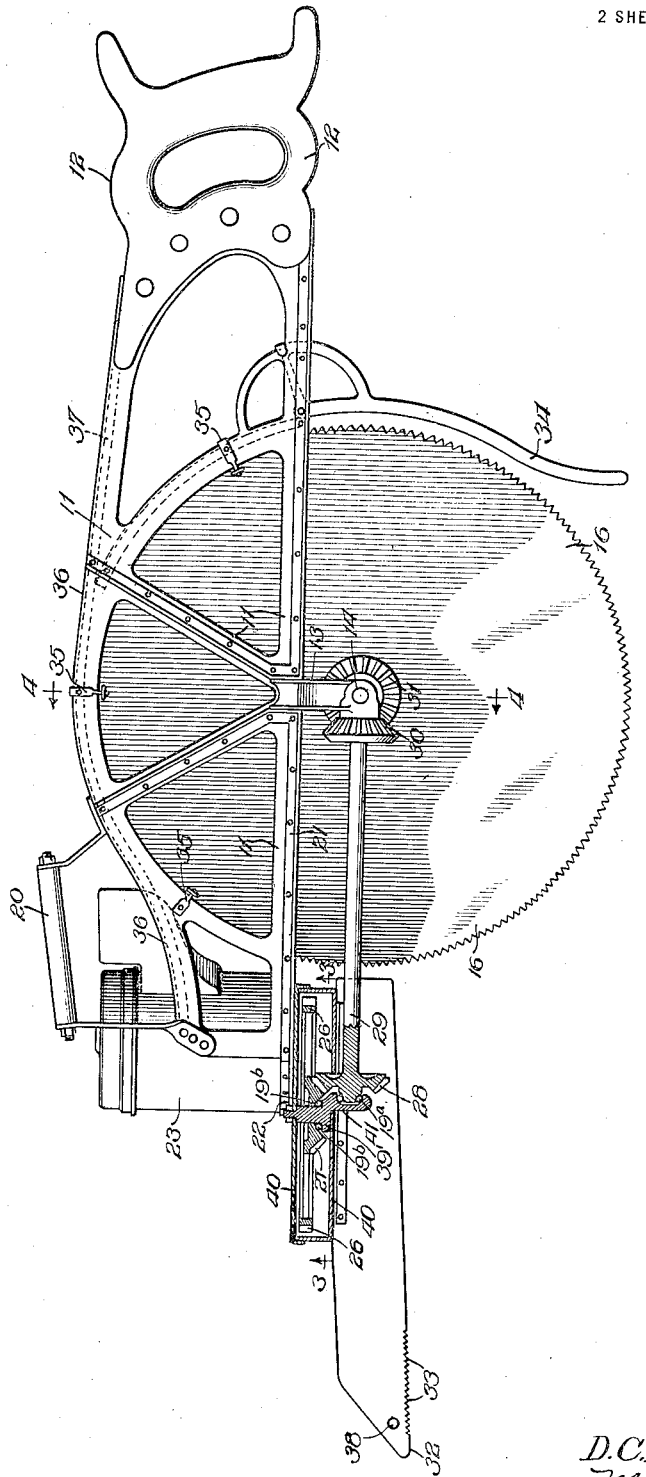

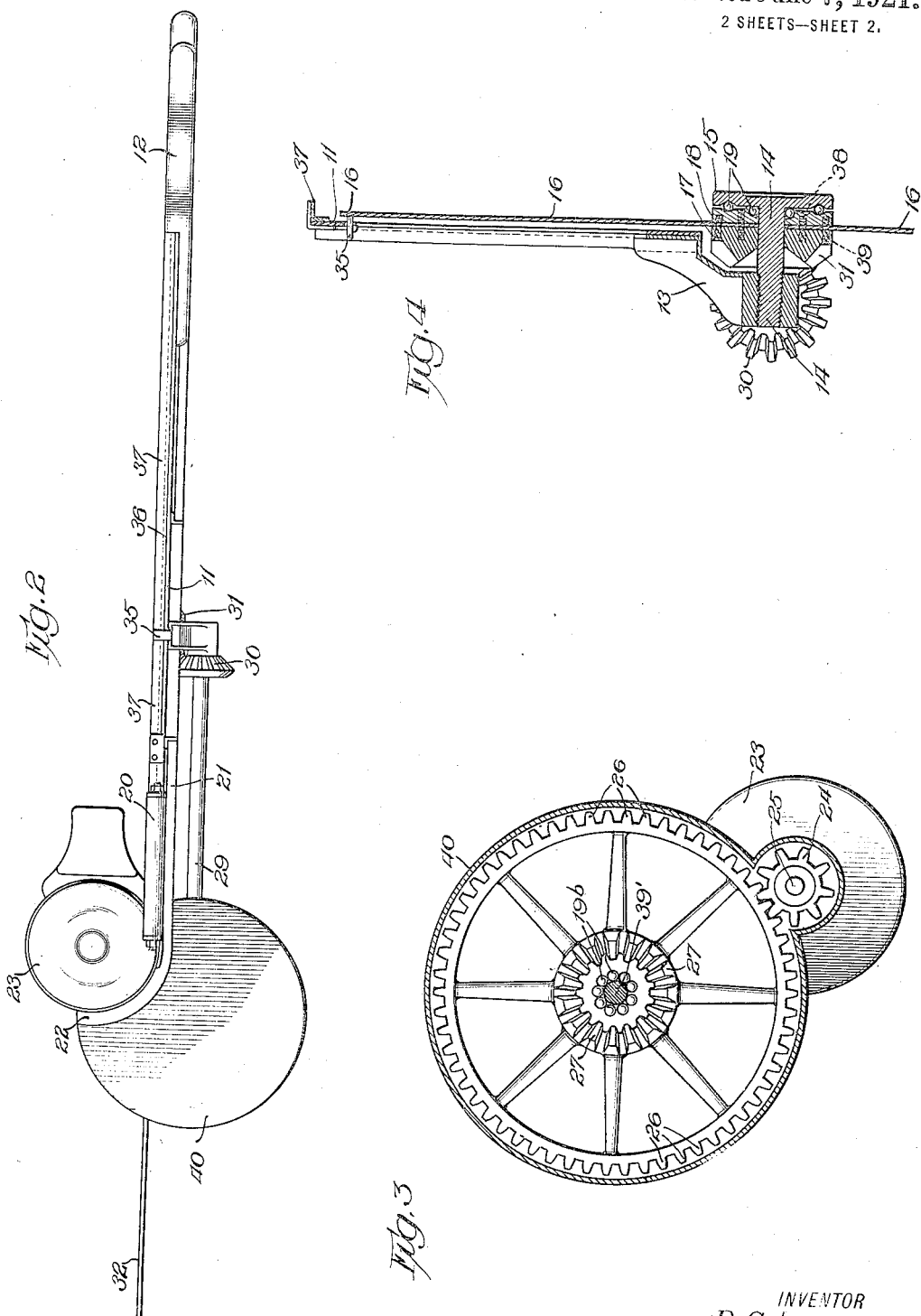

DAVID C. LANGE, OF COLLEGE STATION, TEXAS.

PORTABLE ELECTRIC SAW.

1,380,484. Specification of Letters Patent. Patented June 7, 1921.

Application filed January 5, 1920. Serial No. 349,608.

*To all whom it may concern:*

Be it known that I, DAVID C. LANGE, a citizen of the United States, and a resident of College Station, in the county of Brazos and State of Texas, have invented a new and useful Improvement in Portable Electric Saws, of which the following is a full, clear, and exact description.

My invention relates to improvements in portable electric saws, and it consists in the combinations, constructions and arrangements herein described and claimed:

An object of my invention is to provide a portable electric saw suitable for use when actuated by an electric current with a great saving of time and labor in that an operator may use the same as readily and as accurately as a hand saw in performing many different grades of work much more rapidly and with less physical exertion.

A further object of my invention is to provide a portable electric saw that is light enough to be readily carried by hand from place to place.

A further object of my invention is to provide a device in which the operating mechanism is positioned to assist in producing facile operation in that the weight of same tends to push the saw into the wood without bearing upon the operator's hands.

A further object of my invention is to provide a device of the type described, having movable guard members positioned to preclude danger to the operator without causing friction or otherwise interfering with ease of operation.

A further object of my invention is to provide a portable electric saw, having a means of fastening a circular saw blade to its operating connection that will permit the interchangeable use of circular saw blades adapted to a multiplicity of grades of work.

Other objects and advantages will appear in the following specification, and the novel features of the invention will be particularly pointed out in the appended claims.

My invention is illustrated in the accompanying drawings, forming part of this application, in which—

Figure 1 is a side elevation of my portable electric saw,

Fig. 2 is a plan view of the same,

Fig. 3 is a view along the line 3—3 of Fig. 1,

Fig. 4 is a view along the line 4—4 of Fig. 1.

In carrying out my invention, I make use of a frame member substantially as shown in the accompanying drawings which I have indicated in general at 11. A handle 12, adapted to the grip of the hand, is fixedly fastened to one end of the frame 11. A laterally underhanging bracket hanger 13 is rigidly fastened to the bottom portion of the supporting frame 11 near the central part. In this bracket hanger 13 is screwed a removable pin 14 having a flanged head portion 15. This pin is adapted to the hole in the center of an ordinary circular saw blade 16 which is retained thereon by bushings 17 and 18 which clamp the saw blade and which are held in place by screws 39 and which may be rotated with the circular saw blade 16 upon ball bearings 19 around the pin 14. To the supporting frame 11 near the end opposite from the handle 12 is fixedly fastened another handle 20 also adapted to the grip of the hand. The bottom portion 21 of the supporting frame member 11 is laterally curved at the end opposite the handle 12 to a substantially semi-circular form 22. An incased direct current shunt wound adjustable motor 23 is fastened to the supporting frame 11 within the curved portion 22. A spur gear 24 upon the shaft 25 of the motor 23 engages the toothed rim of a wheel 26. The latter is rotatably mounted upon a stub shaft 39' which is rigidly fastened to a casing 40 at its ends. The stub shaft 39' has an integral casting 41 which projects beyond the casing and forms a ball bearing member for the drive shaft. The wheel 26 has a gear 27 upon its hub portion which meshes with the gear 28 at the end of a drive shaft 29, the drive shaft 29 being provided with ball bearings 19$^a$.

The wheel 26 is also journaled in the ball bearings 19$^b$. The shaft 29 is rotatably connected with the circular saw blade 16 at its central axis through the medium of meshed gears 30 and 31 and the bushings 17 and 18 which hold the circular saw blade 16 in place.

An auxiliary saw blade 32, having a plurality of saw teeth 33 near its extreme end, is fixedly fastened to the lower portion of the end of the frame 11 in alinement with the saw 16. This saw blade 32 has a hole 38 near the center of its extreme end in which an attachment for squaring purposes may be inserted. A guard 34 is pivotally fastened to the bottom portion of the frame 11 and may be swung upwardly toward the handle 12 and out of operative position. Obviously, the guard 34 will contact with the work upon continued forward movement of the circular blade 16 and will be gradually moved about its pivot in the direction of the handle 12 as the circular saw is pushed forwardly, wherefore the guard 34 effectively guards the portion of the saw blade 16 adjacent the hand grasping the handle 12 until the blade is sheathed in the work engaged. A plurality of small contact or guide wheels 35 are fastened to the top portion 36 of the frame 11 between the frame and the saw blade to prevent the saw blade from striking the frame. This top portion 36 of the frame 11 is curved for a part of its length in a substantially semi-circular form to accommodate the circular saw blade 16 rotating upon pin 14. A flanged part 37 of this top portion 36 extends laterally over and forms a guard for the circular saw blade 16.

From the foregoing description of the various parts of the device, the operation thereof may be readily understood. The motor may be connected to an ordinary electric socket or to any other suitable source of current. The operator takes the handle nearest the motor in his left hand and the other handle in his right hand. The motor may be started, stopped, and the speed regulated with the left hand. A notched mark or kerf is first cut in the piece to be sawed with the guide saw 32. The guide saw 32 is then placed upon this mark. The motor is then started and a rotary movement is imparted to the circular saw blade through the intermediate gear and shaft means. The circular saw is brought into contact with the side of the piece of wood nearest the operator and the operation is accomplished by the saw being pushed away from the operator through the wood to the place which the guide saw indicated before the sawing was begun.

I claim:

1. A portable electric saw comprising a frame, a handle at one end of the frame, an electric motor carried by the opposite end of the frame, a second handle near said motor, a circular saw rotatably mounted between said handles, means connected with the motor for rotating the saw, and a pivoted guard member carried by the frame in the rear of the circular saw and arranged to be gradually moved about its pivot into inoperative position upon contact with the work engaged and continued operation of the saw blade.

2. A portable electric saw comprising a frame, a handle at one end of the frame, an electric motor carried by the opposite end of the frame, a second handle near said motor, a circular saw rotatably mounted between said handles, means connected with the motor for rotating the saw, and an auxiliary saw blade carried by the frame and disposed in the plane of the circular saw and in advance thereof.

3. A portable electric saw comprising a frame having an underhanging bracket, a circular saw mounted on said bracket for rotation, said frame having a laterally extending flange covering the upper part of said circular saw, a handle carried by the frame, a motor carried by the frame on the opposite side from the handle, gearing connecting said motor with said circular saw for operating the latter, an auxiliary handle secured to said frame near said motor, and a guard, curved to conform to the circular saw, being disposed between the rear of the saw and the first mentioned handle, and being movable from its guarding position toward the handle.

4. A portable electric saw comprising a frame having an underhanging bracket, a circular saw mounted on said bracket for rotation, said frame having a laterally extending flange covering the upper part of said circular saw, a handle carried by the frame, a motor carried by the frame on the opposite side from the handle, gearing connecting said motor with said circular saw for operating the latter, an auxiliary handle secured to said frame near said motor, a guard, curved to conform to the circular saw, being disposed between the rear of the saw and the first mentioned handle, and being movable from its guarding position toward the handle, and an auxiliary saw blade disposed in advance of the circular saw and being in the same plane, said auxiliary saw blade being carried by the frame.

DAVID C. LANGE.